United States Patent
Chen et al.

(10) Patent No.: US 10,585,774 B2
(45) Date of Patent: Mar. 10, 2020

(54) DETECTION OF MISBEHAVING COMPONENTS FOR LARGE SCALE DISTRIBUTED SYSTEMS

(71) Applicant: International Business Machines Corporation, Armonk, NY (US)

(72) Inventors: Peng Fei Chen, Beijing (CN); Fan Jing Meng, Beijing (CN); Feng Wang, Rueschlikon (CH); Yuan Wang, Beijing (CN); Jing Min Xu, Beijing (CN); Xiao Zhang, Xi'an (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 113 days.

(21) Appl. No.: 15/717,879

(22) Filed: Sep. 27, 2017

(65) Prior Publication Data

US 2019/0095266 A1 Mar. 28, 2019

(51) Int. Cl.
*G06F 11/34* (2006.01)
*G06N 5/02* (2006.01)
(Continued)

(52) U.S. Cl.
CPC ...... *G06F 11/3447* (2013.01); *G06F 11/2263* (2013.01); *G06N 5/022* (2013.01); *G06N 20/00* (2019.01)

(58) Field of Classification Search
CPC ............ G06F 11/0709; G06F 11/0748; G06F 11/0754; G06F 11/076; G06F 11/2257;
(Continued)

(56) References Cited

U.S. PATENT DOCUMENTS 5,919,267 A * 7/1999 Urnes ................ G06F 11/0736
714/26
10,102,056 B1 * 10/2018 Goldberg ............. G06F 11/079
(Continued)

OTHER PUBLICATIONS

Wikipedia, "Unsupervised Learning", May 23, 2016. (Year: 2016).*
(Continued)

*Primary Examiner* — Gabriel Chu
(74) *Attorney, Agent, or Firm* — Intelletek Law Group, PLLC; Gabriel Daniel, Esq.

(57) ABSTRACT

A method or apparatus for monitoring a system by detecting misbehaving components in the system is presented. A computing device receives historical data points based on a set of monitored signals of a system. The system has components that are monitored through the set of monitored signals. For each monitored component, the computing device performs unsupervised machine learning based on the historical data points to identify expected states and state transitions for the component. The computing device identifies one or more steady components based on the identified states of the monitored components. The computing device also receives real-time data points based on monitoring the set of signals from the system. For each identified steady component, the computing device examines the received real-time data points for deviation from the expected state and state transitions of the steady component. The computing device reports anomaly in the system based on the detected deviations.

17 Claims, 10 Drawing Sheets

(51) Int. Cl.
*G06N 20/00* (2019.01)
*G06F 11/22* (2006.01)

(58) Field of Classification Search
CPC ............ G06F 11/2263; G06F 11/2294; G06F 11/277; G06F 11/3006; G06F 11/3447; G06F 11/3452; G06N 20/00; G06N 5/022; H04L 43/08
See application file for complete search history.

(56) References Cited

U.S. PATENT DOCUMENTS

| | | | |
|---|---|---|---|
| 2007/0038838 A1* | 2/2007 | Greis | G06F 11/008 711/207 |
| 2008/0250265 A1 | 10/2008 | Chang | |
| 2010/0318837 A1 | 12/2010 | Murphy | |
| 2014/0324739 A1* | 10/2014 | Claussen | G06N 20/00 706/12 |
| 2015/0071492 A1* | 3/2015 | Barr | G06N 7/005 382/103 |
| 2016/0153806 A1* | 6/2016 | Ciasulli | G06F 11/0751 702/184 |
| 2016/0292028 A1 | 10/2016 | Gamage | |
| 2016/0315826 A1* | 10/2016 | Abdulnour | H04L 41/16 |
| 2016/0330225 A1* | 11/2016 | Kroyzer | G06F 21/552 |
| 2017/0010931 A1* | 1/2017 | Agarwal | G06F 11/079 |
| 2017/0279838 A1* | 9/2017 | Dasgupta | H04L 63/1425 |

OTHER PUBLICATIONS

Gainaru et al., "Errors and Faults," Fault-Tolerance Techniques for High-Performance Computing, Springer International Publishing, Switzerland, 2015, Chapter 2, pp. 89-144.

* cited by examiner

DETECTION OF MISBEHAVING COMPONENTS FOR LARGE SCALE DISTRIBUTED SYSTEMS

BACKGROUND

Technical Field

The present disclosure generally relates to system monitoring.

Description of the Related Art

System/application failures are prevalent and may be unavoidable in large systems such as business systems for well-known e-commerce, social media, and Internet service providers. System/service providers therefore monitor their systems with thousands of metrics and anomaly alerts to prevent unplanned outages and minimize negative impact to their customers.

SUMMARY

Some embodiments of the disclosure provide a method or apparatus for monitoring a system by detecting misbehaving components in the system.

During a training phase, a behavior-learning computing device receives data points based on a set of monitored signals or metrics of a system. The system has components that are monitored through the set of monitored signals. For each monitored component, the behavior-learning computing device performs unsupervised machine learning based on the received data points to identify a set of states and a set of state transitions among the identified states for the component. The behavior-learning computing device identifies one or more steady components based on the identified states of the monitored components. The identified states and state transitions of each steady component are for detecting anomalies in the system based on real-time data points of the system that deviate from the identified states and state transitions. The behavior-learning computing device also generates component behavior models for the identified steady components based on the identified states and state transitions of the identified steady components.

During a detection phase, an anomaly-detecting computing device is configured to receive the set of monitored signals of the system. The anomaly-detecting computing device receives data points based on the monitored signals. The anomaly-detecting computing device also receives the component behavior models generated by the behavior-learning computing device. For each identified steady component, the anomaly-detecting computing device examines the received data points based on the received component behavior models to detect deviation with the expected states and state transitions. The anomaly-detecting computing device reports anomalies in the system based on the detected deviations.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

System/application failures are prevalent and may be unavoidable in large systems, such as business systems for well-known e-commerce, social media, and Internet service providers. These well-known business systems have all experienced outages that affected the level of service millions to their customers. System/service providers therefore monitor their systems with thousands of metrics and anomaly alerts to prevent unplanned outages and minimize negative impact to their customers.

It is difficult to identify misbehaving components in a large system that has a very large number of components with dynamic and unpredictable workloads. It is also difficult to monitor high dimensional data points that may include metrics for processors (system load, user load, etc.), memories (persistence, swap, etc.), storage, and networks (response time, connection numbers, etc.). It is also difficult to set threshold values for multiple different types of components and implementation strategies. Detection of anomaly in a large system may rely on thresholds on metrics, predefined rules, and/or probing system calls. However, these solutions may be unsuitable due to computation complexity, consideration of foreknowledge, and large overhead.

Some embodiments of the disclosure provide methods or apparatus for detecting anomalies in a system. A computing device receives data points based on monitoring components of the system by monitoring a set of signals or metrics from the system. The system includes multiple components that are monitored by using the monitored signals or metrics. For each monitored component, the computing device performs unsupervised machine learning based on the received data points to identify a set of states and a set of state transitions. The computing device also identifies one or more steady components based on the identified states of the monitored components. The identified states and state transitions of each steady component are then used to detect anomalies in the system based on real-time data points of the system that deviate from the identified states and state transitions.

Figure 1:
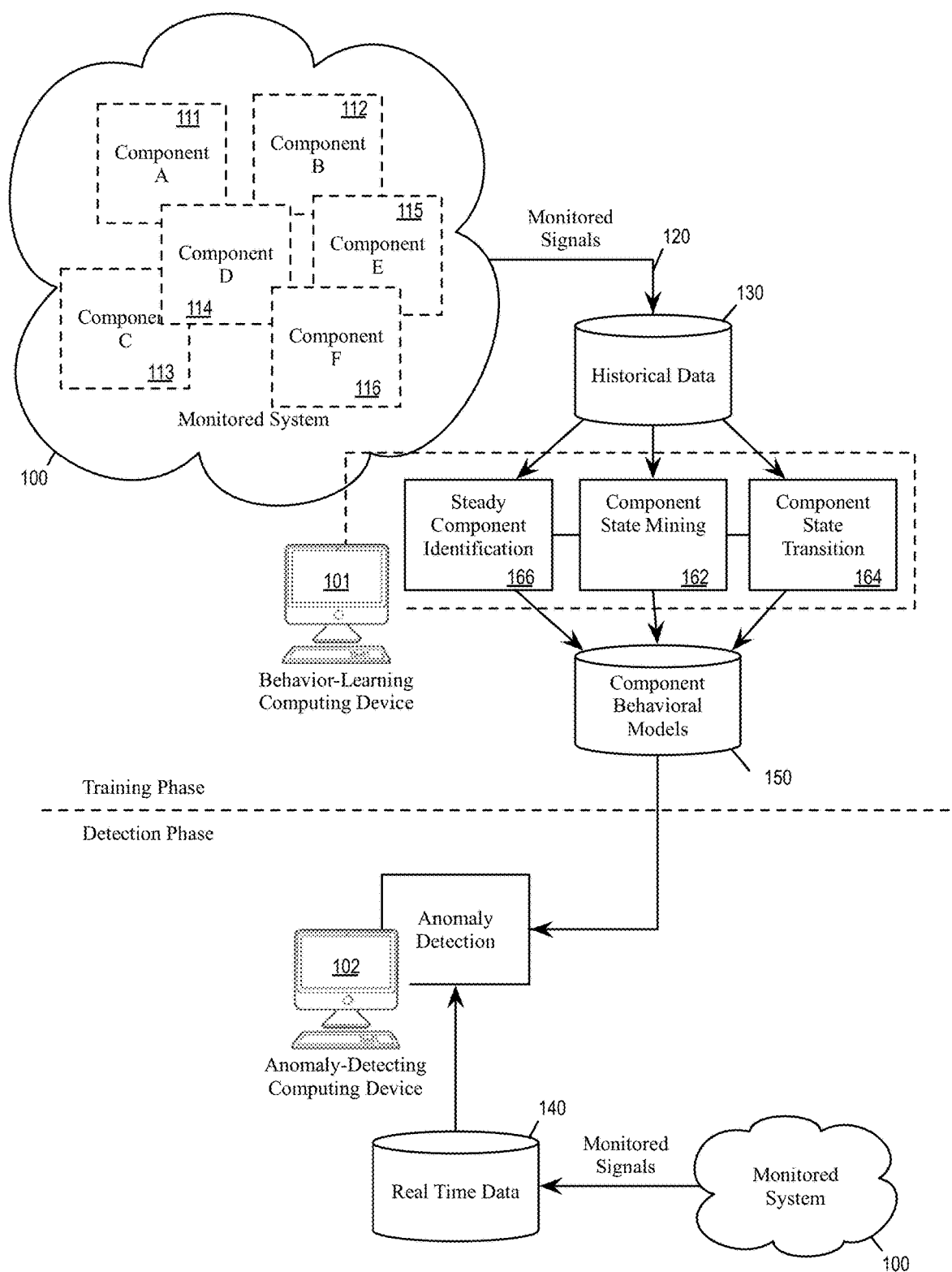
FIG. 1 illustrates the detection of anomalous behavior in a system, consistent with an exemplary embodiment.

FIG. 1 illustrates the detection of anomaly behavior in a system 100, consistent with an exemplary embodiment. During a training phase, a behavior-learning computing device 101 receives historical or training data points based on monitored signals or metrics from the system 100 to generate behavior models 150. During a detection phase, an anomaly-detecting computing device 102 receives real-time data points from the system 100 and uses the behavior models 150 to examine the received real-time data points in order to detect anomalies in the system 100.

The system 100 may include various computing devices, servers, running program processes, threads, jobs, storage devices, network components that interconnected by one or more networks or the cloud. The system 100 is being monitored through a set of monitored signals 120. The monitored signals can be carried by wired or wireless communications mediums to a communications circuit of a monitoring device and/or a recording device (such as the computing devices 101 and/or 102).

The monitored signals are captured/observed periodically or repeatedly as data samples. During the training phase, the data samples of the monitored signals can be stored as historical data (in historical data storage 130) or processed directly by the behavior-learning computing device 101. During the detection phase, the data samples of the monitored signals can be stored as real-time data (in real-time data storage) 140 or processed directly by the anomaly-detecting computing device 102. The computing devices 101 and 102 may be different devices that monitor the system 100 at different locations and/or at different times. The computing devices 101 and 102 may also be the same device that learns the behaviors of the system 100 during the training phase and detects anomalous behaviors in the system 100 during the detection phase.

The monitored signals 120 may carry data such as status, outputs, internal states, statistics, usage, observable internal nodes, data flow, or other types of data produced by the system 100. Such data can include metrics for measuring the performance or usage of various computing and storage device in the system, metrics such as CPU usage, memory usage, storage usage, access latency, etc. of various devices.

The monitored signals 120 are used to monitor components in the system 100, including components 111-116. The system may have other components that are not illustrated but are monitored by the behavior-learning computing device 101 and the anomaly-detecting computing device 102. In some embodiments, the behavior-learning computing device 101 defines the components that it is monitoring by associating each component with a set of data samples (of monitored signals or metrics). Each component is monitored through its associated set of data samples, and different components may be associated with different sets of data samples. A component can correspond to any stateful or stateless process operating in the system that takes input to produce output. A component can also be a physical device or a virtual entity in the system that is operating such a process. Such a component can therefore be an operating system running in a computing system, an application, a computing thread, a software module, a hardware module, an integrated circuit (IC), a central processing unit (CPU), a server device, a network router, a multi-device process that encompasses multiple computing devices across a network, user programs/applications, macros, machines, automata, or any combination thereof, or any entity or collection of entities whose resource consumption and/or functional indicator can be monitored or observed.

The behavior-learning computing device 101 uses the data samples in historical data 130 to learn the characteristics of the components in the system in order to produce the component behavior models 150. Specifically, the device 101 learns the states of each component, the state transitions of each component, and determines which components are steady components. The behavior-learning device 101 correspondingly includes a component state mining module 162, a component state transition map generation module 164, and a steady component identification module 166. These modules may be modules of software instructions being executed by one or more processing units (e.g., a processor) of a computing device or an electronic apparatus. These modules may also be modules of hardware circuits implemented by one or more integrated circuits (IC) of an electronic apparatus.

During the detection phase, the anomaly-detecting computing device 102 uses the behavior models 150 learned during the training phase to detect anomalous behaviors by the system 100. Specifically, the real-time data samples captured from the monitored signals 120 during the detection phase are compared with the behavior models 150 to detect deviation from expected behaviors by the components in the system (such as components 111-116).

In some embodiments, the behavior-learning computing device 101 analyzes the data samples associated with each component as multi-dimensional data points for the component. Specifically, the data samples for a component may include different types of data (e.g., different types of statistics for different devices), and these different types of data are mapped to different dimensions of the data points. For each component, the behavior-learning computing device 101 uses the multi-dimension data points to identify the states and the state transitions of the component.

Figure 2:
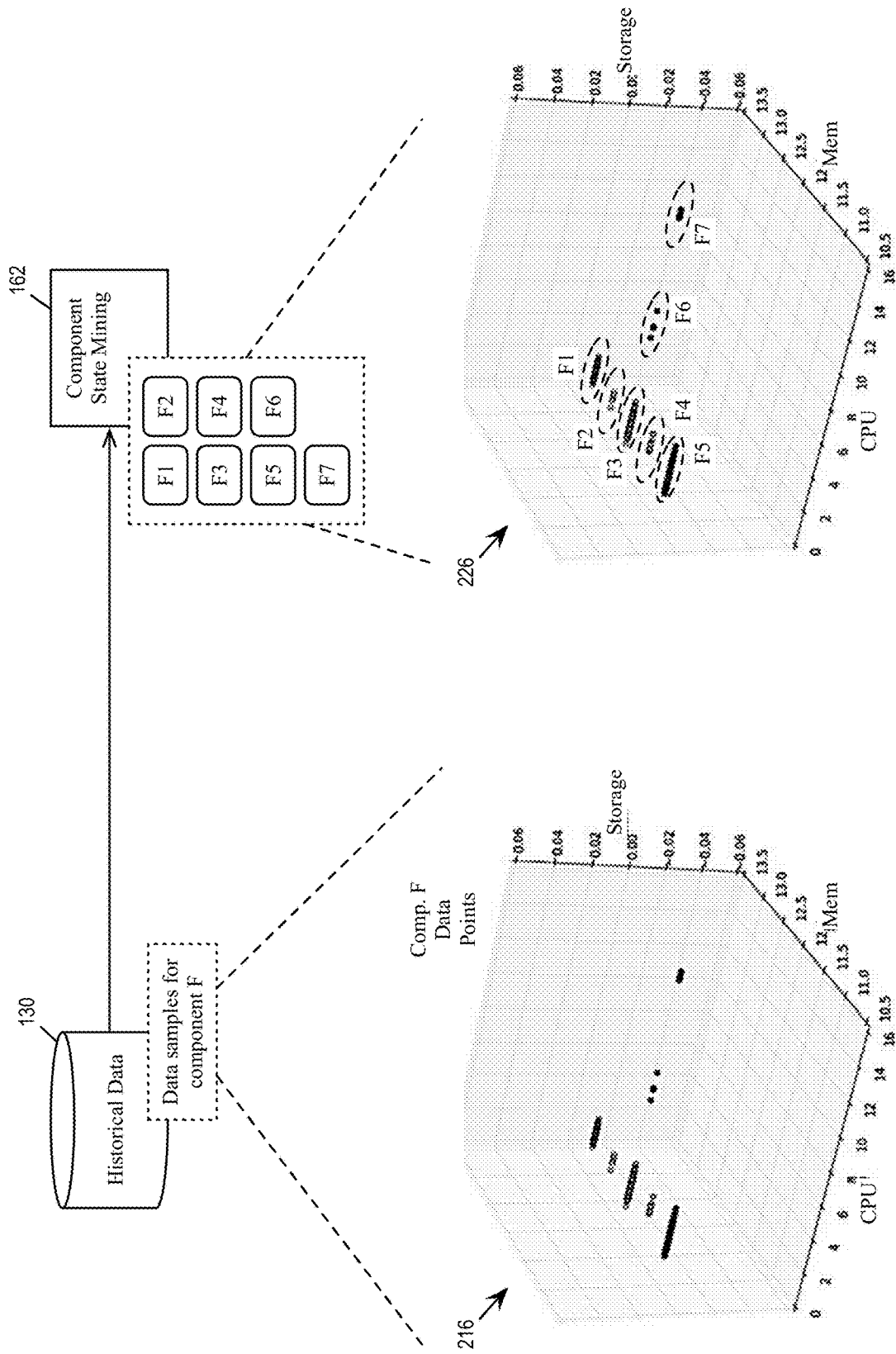
FIG. 2 illustrates using multi-dimension data points of a component to identify the component's states, consistent with an exemplary embodiment.

FIG. 2 illustrates using multi-dimension data points of a component to identify the component's states, consistent with an exemplary embodiment. The figure illustrates the identification of states of the component 116 (component F) based on historical data samples stored in the historical data storage 130.

As illustrated, the behavior-learning computing device 101 receives data samples for component F (from the historical data storage 130). The received data samples include metrics such as CPU usage, memory usage, and storage usage of certain devices in the system. These different types of data samples are processed as multi-dimensional data points for the component. Each data point represents a set of data samples that are associated with one time instance. As illustrated in the figure, component F data points associated with different time instances are plotted in a three-dimensional graph 216 having axis along a CPU dimension, a memory dimension, and a storage dimension.

The component state mining module 162 performs unsupervised machine learning on the data points to group the data points into different clusters. Each cluster of data points corresponds to a state of the component F. In some embodiments, the component state mining module 162 performs DBSCAN (density-based spatial clustering of applications with noise) algorithm to perform the clustering of the data points. As illustrated in three-dimension graph 226, the component state mining module 162 identifies the clusters of component F data points as corresponding to seven different states F1 through F7. In some embodiments, the component state mining module 162 performs unsupervised machine learning for all defined components in order to identify their states. (One of ordinary skill in the art would understand that the naming of the states is entirely arbitrary; for example, each state can be named based on the order that they are identified.)

Figure 3:
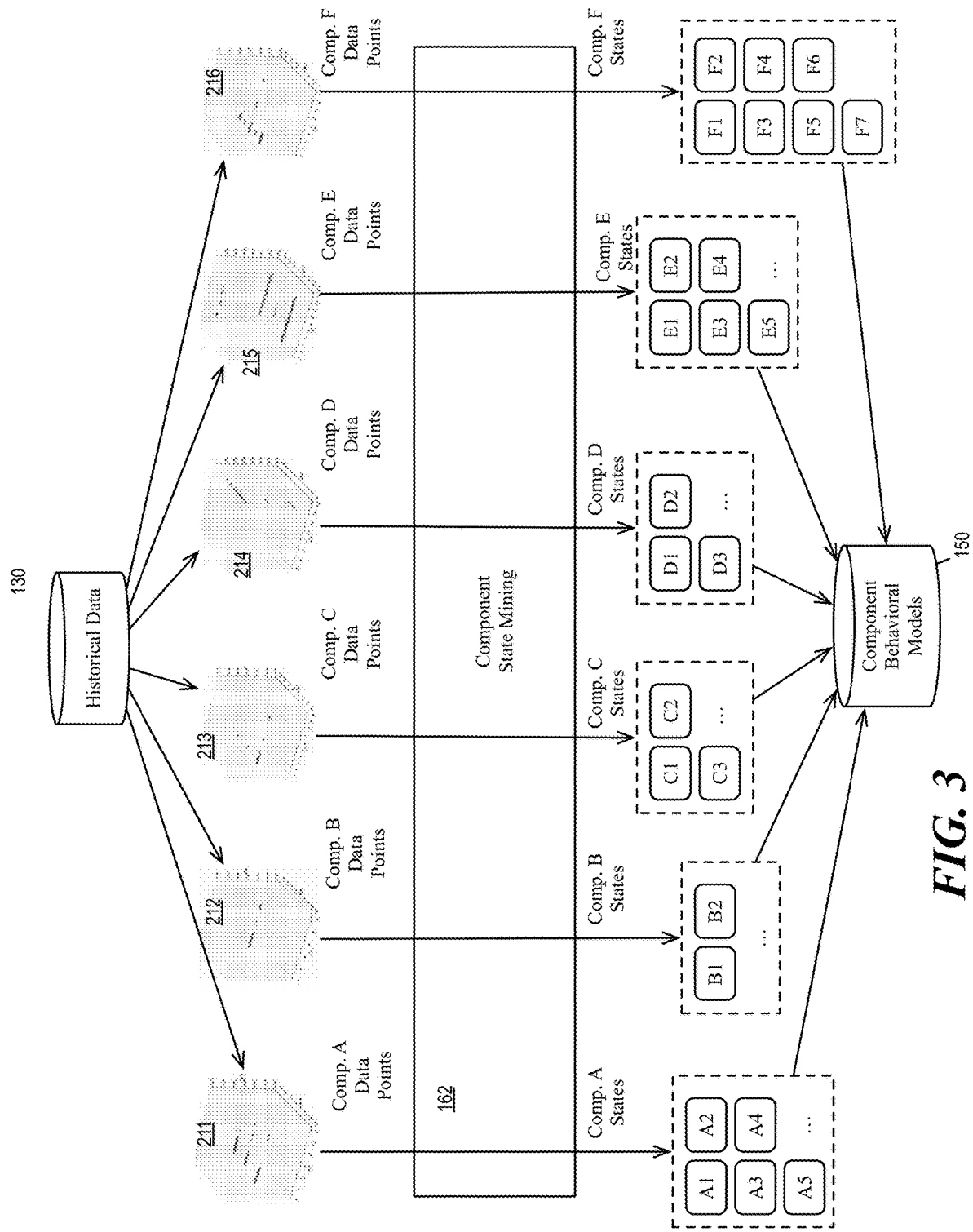
FIG. 3 illustrates the identification of states for the components of the system, consistent with an exemplary embodiment.

FIG. 3 illustrates the identification (or mining) of states for the components of the system 100, consistent with an exemplary embodiment. The component state mining module 162 perform unsupervised machine learning based on data samples stored in the historical data 130. The data samples are processed as data points of components A, B, C, D, E, and F (data points 211-216 for components 111-116, respectively). The data points of the components are in turn used to identify the states of those components by the component state mining module 162. As illustrated, the identified states of component A includes states A1-A5, the identified states of component B includes states B1-B2, the identified states of component C includes states C1-C3, the identified states of component D includes states D1-D3, the identified states of component E includes states E1-E5, and the identified states of component F includes states F1-F7 (as described by reference to FIG. 2 above). The identified states are stored as part of the component behavior models 150.

The behavior-learning computing device 101 not only identifies the states for components of the monitored system, but also identifies the transitions between the different states. In some embodiments, the component state transition map generation module 164 generates a map of state transitions based on the identified states of the component as well as based on the data points of components. For each identified state transition, the component state transition map generation module 164 also calculates a probability based on statistics derived from the received data points of the component. Such a probability is indicative of how often the state transition is expected to occur under normal circumstances.

Figure 4:
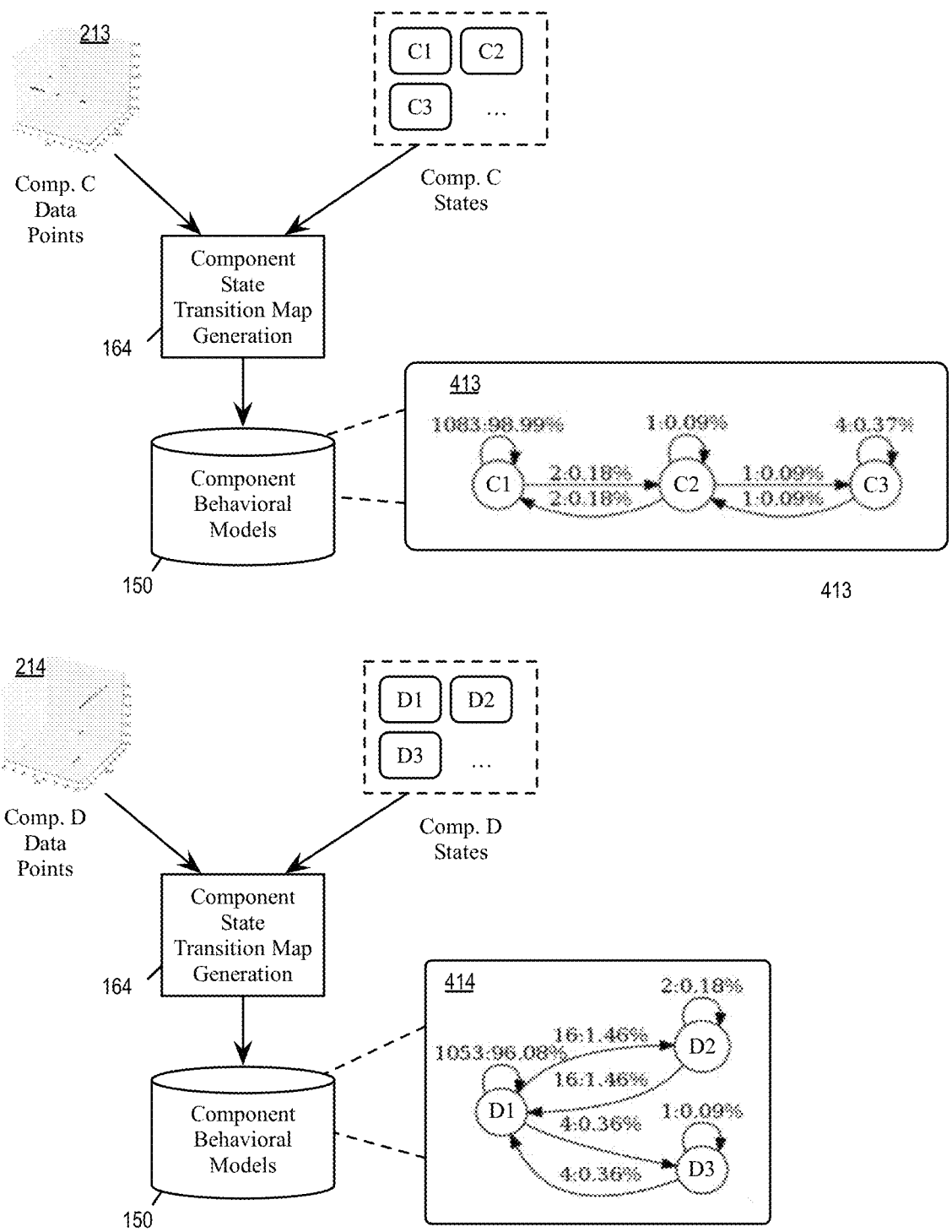
FIG. 4 illustrates example component state transition maps that are generated based on the data points of the components.

FIG. 4 illustrates example component state transition maps that are generated based on the data points of the components. The generated state transition maps includes the identified states, the transitions between the identified states, and the probability of each transition. The figure illustrates example state transition maps for components C and D (113 and 114).

The component state transition map generation module 164 receives data points 213 for component C as well as data regarding the identified states of component C (e.g., produced by the component state mining module 162). The received data points 213 and identified states are used to generate a state transition map 413.

The state transition map 413 shows the transitions from the identified states of component C, specifically, transitions among states C1, C2 and C3. As illustrated in the state transition map 413, the state C1 has transitions to the state C2 and itself, the state C2 has transitions for states C1, C3 and itself, and the state C3 has transitions to the state C2 and itself. In some embodiments, the component state transition map generation module 164 identifies a transition from a first state to a second state by detecting a first data point belonging to a cluster of the first state being temporally followed by a second data point belonging to a cluster of the second state.

The state transition map 413 also shows the probability of each state transition for the component C. The probabilities of the transitions are calculated from the tallies of the detected transitions. As illustrated, the tally of transitions from C1 to itself is 1083, the tally of transitions from C1 to C2 is 2, the tally of transition from C2 to itself is 1, the tally of transitions from C2 to C1 is 2, the tally of transitions from C2 to C3 is 4, the tally of transitions from C3 to itself is 4, the tally of transitions from C3 to C2 is 1. Correspondingly, the probability of transitions from C1 to itself is 98.99%, the probability of transitions from C1 to C2 is 0.18%, the probability of transition from C2 to itself is 0.09%, the probability of transitions from C2 to C1 is 0.18%, the probability of transitions from C2 to C3 is 0.09%, the probability of transitions from C3 to itself is 0.37%, the probability of transitions from C3 to C2 is 0.09%.

The component state transition map generation module 164 also receives data points 214 for components D as well as data regarding the identified states of component D. The received data points 214 and identified states are used then to generate a state transition map 414. The state transition map 414 shows the transitions from the identified states of component D (states D1, D2 and D3). The state transition map 414 also shows the probability of each state transition for the component D.

The generated component state transition maps 413 and 414 (along with state transition maps of other components that are not illustrated) are included or stored into the component behavior models 150.

In some embodiments, the detection of anomalous behavior in the system 100 relies on monitoring components that are steady or stable. Each steady component is a component for which the behavior-learning computing device 101 is able to identify a finite set of predictable states from its data points within a threshold timing window. Components for which the behavior-learning computing device 101 is not able to identify finite and predictable states from the data points within the threshold timing window are considered non-steady and are not used for detecting anomalous behavior in the system 100.

In some embodiments, the behavior-learning computing device 101 identifies one or more steady components based on the identified states of the components. The identities of such steady components are stored in the behavior models 150 so that the anomaly-detecting computing device 102 knows which components are steady components and can be used to detect anomalous behaviors in the system. In some embodiments, the behavior models 150 stores state and state transitions for only the components identified as steady components but not for components not identified as steady components.

Figure 5:
FIG. 5 conceptually illustrates the identification of steady components, consistent with an exemplary embodiment.

FIG. 5 conceptually illustrates the identification of steady components, consistent with an exemplary embodiment. The figure includes a bar graph 500 for an example system having hundreds of monitored components.

The horizontal axis of the bar graph 500 represents the time (or time slots) at which the data samples are taken from the system. The system 100 includes 820 monitored components. The example bar graph is based on data points taken over a total observation period of 1100 time slots. The data points are used to identify states and state transitions (e.g., by the behavior-learning computing device 101) in each of these 820 monitored components.

For some components, all of their identified state and state transitions were detected relatively early in the observation period (e.g., before the 500th time slot), indicating that these components are likely steady or stable because each of these components has no other states or state transition to be detected and identified. For some other components, new states and state transitions are still being detected late in the observation period, indicating that these components are likely non-steady or unstable. These components may have states or state transitions that cannot be reached within the observation period, or that these components do not have finite set of predicable states and state transitions.

In the bar graph 500, each vertical bar of a time slot represents the percentage of the components in the system having already exhibited all identified states and state transitions at that time slot. Thus, for example, at time slot 200, about 30% of the components have already exhibited all of their identified states and state transitions; at time slot 1000, about 80% of the components have already exhibited all of their identified states and state transitions.

In some embodiments, the behavior-learning computing device 101 uses a convergence threshold to identify steady components. The convergence threshold defines a threshold timing window, and only components that have exhibited all identified states and state transitions within the threshold timing window are identified as steady components. In the illustrated example, the convergence threshold is set at time slot 500. In other words, components that have already exhibited all detected states before time slot 500 are identified as steady components, while components that have not already exhibited all detected states before slot 500 are not identified as steady components, since it is likely there are other states or state transitions that exists beyond the observation period. According to the example convergence threshold, around 30% of the components in the system are identified as steady components. The identities of these steady components are stored in the component behavior models 150 for subsequent detection of anomalous behavior in the system 100.

In some embodiments, the behavior-learning computing device 101 computes a degree of convergence for each component. The degree of convergence (CD) of a component having m states is defined as:

$$CD=[T_n-\mathrm{Min}(T_{m-1})]/(T_n-T_0)$$

Where $T_n$ is the ending time slot of the observation period, $T_0$ is the starting time slot of the observation period (so $T_n-T_0$ is the observation period), $T_{m-1}$ is the time slot at which the component has exhibited all m states at least once (e.g., when it exhibits the last state m−1 for the first time). For example, a component that exhibits all states at time slot 500 would have convergence degree of (1100−500)/1100=0.54; a component that exhibits all states near the earliest time slot would have convergence degree near 0.99; a component that exhibits all states near the last time slot would have convergence degree near 0.00; etc. In some embodiments, the threshold timing window (or convergence threshold) is defined so that the components qualified as steady components would all have convergence degree greater than a certain ratio (say 0.80).

The detected states and the state transitions of the identified steady components are integrated into the component behavior models 150 for the anomaly-detecting computing device 102. The anomaly-detecting computing device 102 in turn uses the behavior models 150 to check the data samples monitored from the system 100 in real time (during the detection phase). In some embodiments, the behavior models 150 are used to detect data points of steady components that deviate from their corresponding identified (expected) states and state transitions.

Figure 6:
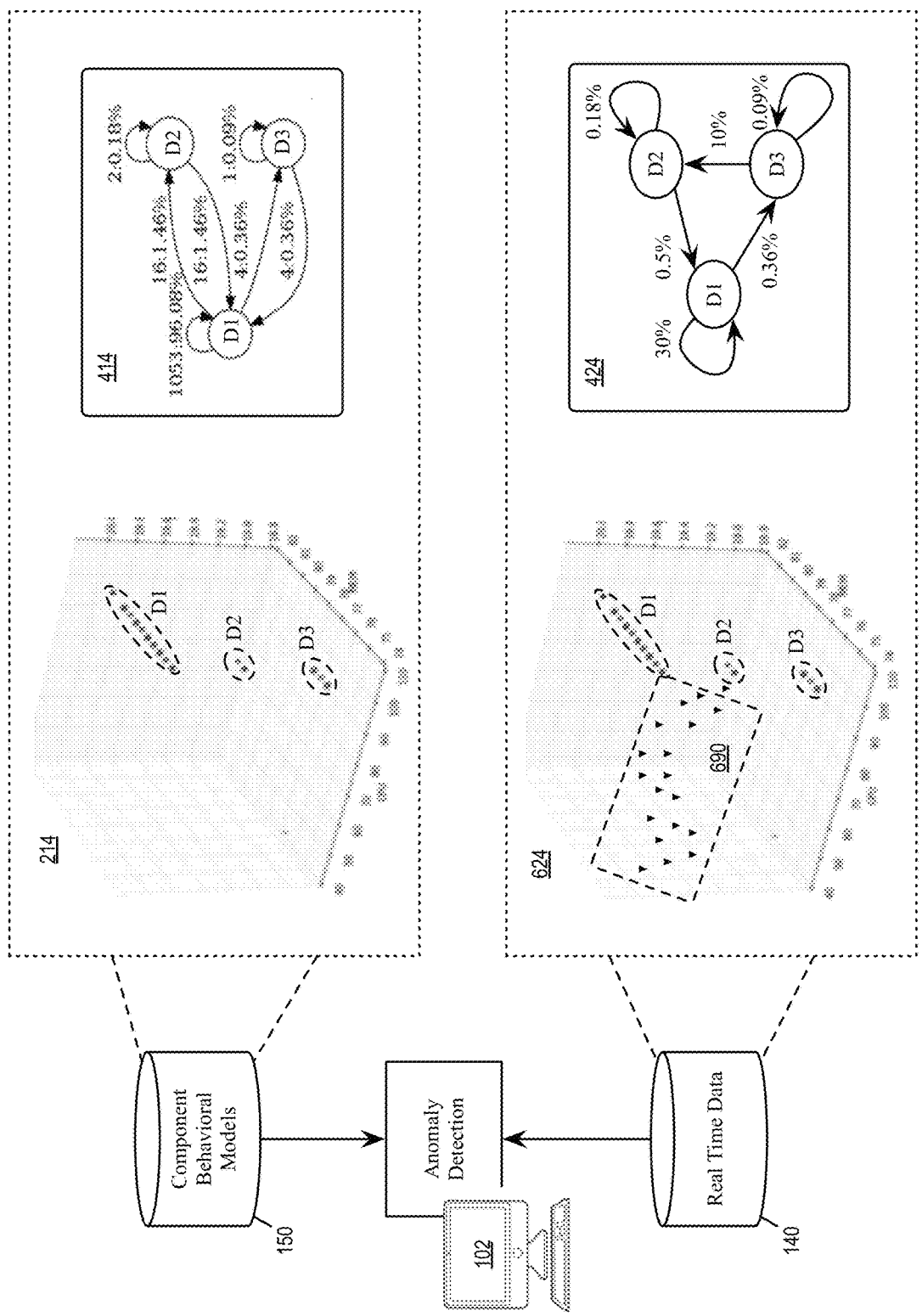
FIG. 6 illustrates the detection of anomalous behavior in the system by using the behavior models, consistent with an exemplary embodiment.

FIG. 6 illustrates the detection of anomalous behavior in the system 100 by using the behavior models 150, consistent with an exemplary embodiment. The anomaly-detecting computing device 102 uses the behavior models 150 to determine whether data points received from the system 100 during detection phase deviate from expected behaviors according to the behavior models 150. In the illustrated example, the anomaly-detecting computing device 102 uses the behavior model of component D (114) to examining the real-time data points of component D stored in real-time data storage 140 (or collected directly from the monitored signals 120 of the system 100). The component D is identified as a steady component by the behavior-learning computing device 101 during the training phase.

According to the behavior models 150 and as shown in multi-dimensional graph 214, the multi-dimensional data points for the component D is expected to exhibit states D1, D2, and D3 but no other states (i.e., the data points are expected to fall within or near the clusters corresponding to D1, D2, and D3). The state transitions among the states D1, D2, and D3 are expected to abide by the state transition map 414, which also specifies the probabilities of occurrence of each state transition.

The data samples relevant to component D in the real-time data 140 are shown as real-time data points in a multi-dimensional graph 624. According to multi-dimensional graph 624, many of the real-time data points do not belong to states D1, D2, and D3 (e.g., sufficiently far away from the clusters that corresponds to states D1, D2, and D3). These wayward data points include those depicted as triangles within a rectangle 690. The existence of these wayward data points indicates abnormal states at component D (due to e.g., failure in component D or abnormal inputs to component D). The anomaly-detecting computing device 102 in turn generates an alert or a report based on the abnormality detected at component D.

The anomaly-detecting computing device 102 also uses the real-time data points to detect real-time transitions between states D1, D2, and D3. The detected state transitions are tallied and compared with their corresponding expected probabilities in component behavior models 150. The real-time probabilities (or frequencies of occurrences) of the state transitions of component D are illustrated in state transition map 424. As illustrated, the actual probabilities of the real-time state transitions (as shown in the transition map 424) are different than the expected probabilities specified by the behavior model 150 (as shown in transition map 414). These differences also indicate misbehaviors detectable at component D. The anomaly-detecting computing device 102 in turn generates an alert or a report based on the abnormality detected at component D.

Figure 7:
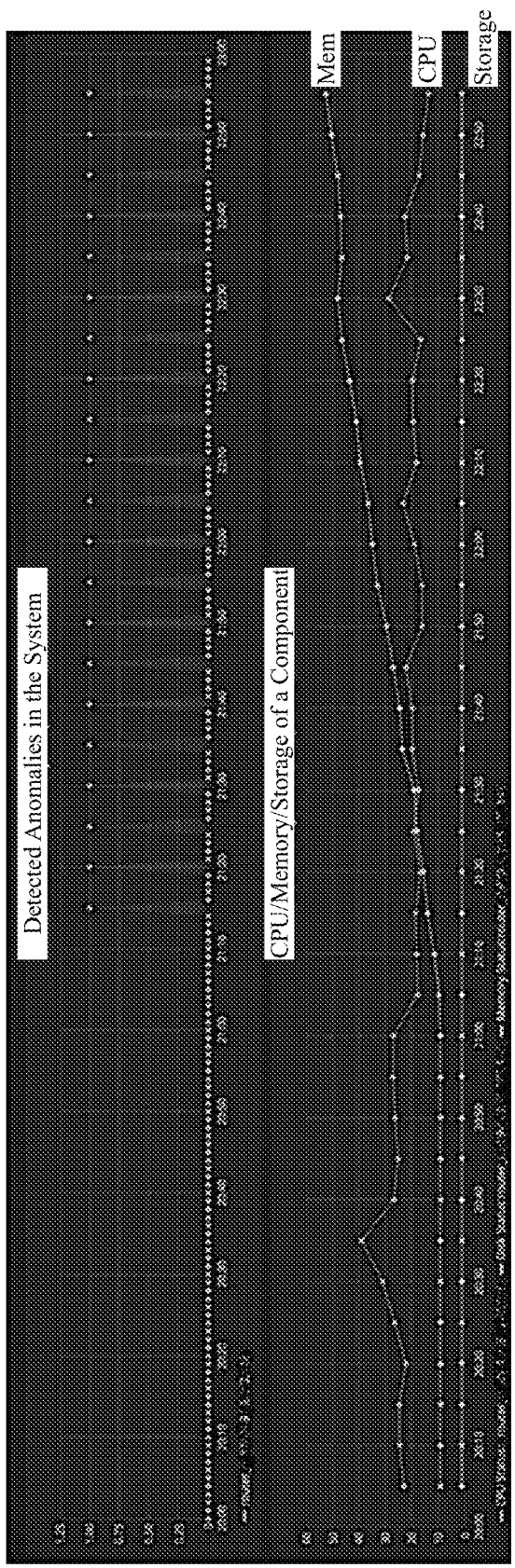
FIG. 7 illustrates an example report generated by the anomaly-detecting computing device.

FIG. 7 illustrates an example report 700 generated by the anomaly-detecting computing device 102. The report includes a graph showing several monitored signals, including CPU, Memory, and Storage usage status. The anomaly-detecting computing device 102 determines that there is an anomaly with the system based on the relationships among these monitored signals. This is accomplished by the anomaly-detecting computing device 102 mapping the data samples of these monitored signals into multi-dimensional data points and checking the mapped data points against the identified states and state transitions of an identified steady component of the system as described above by reference to FIG. 6.

Figure 8:
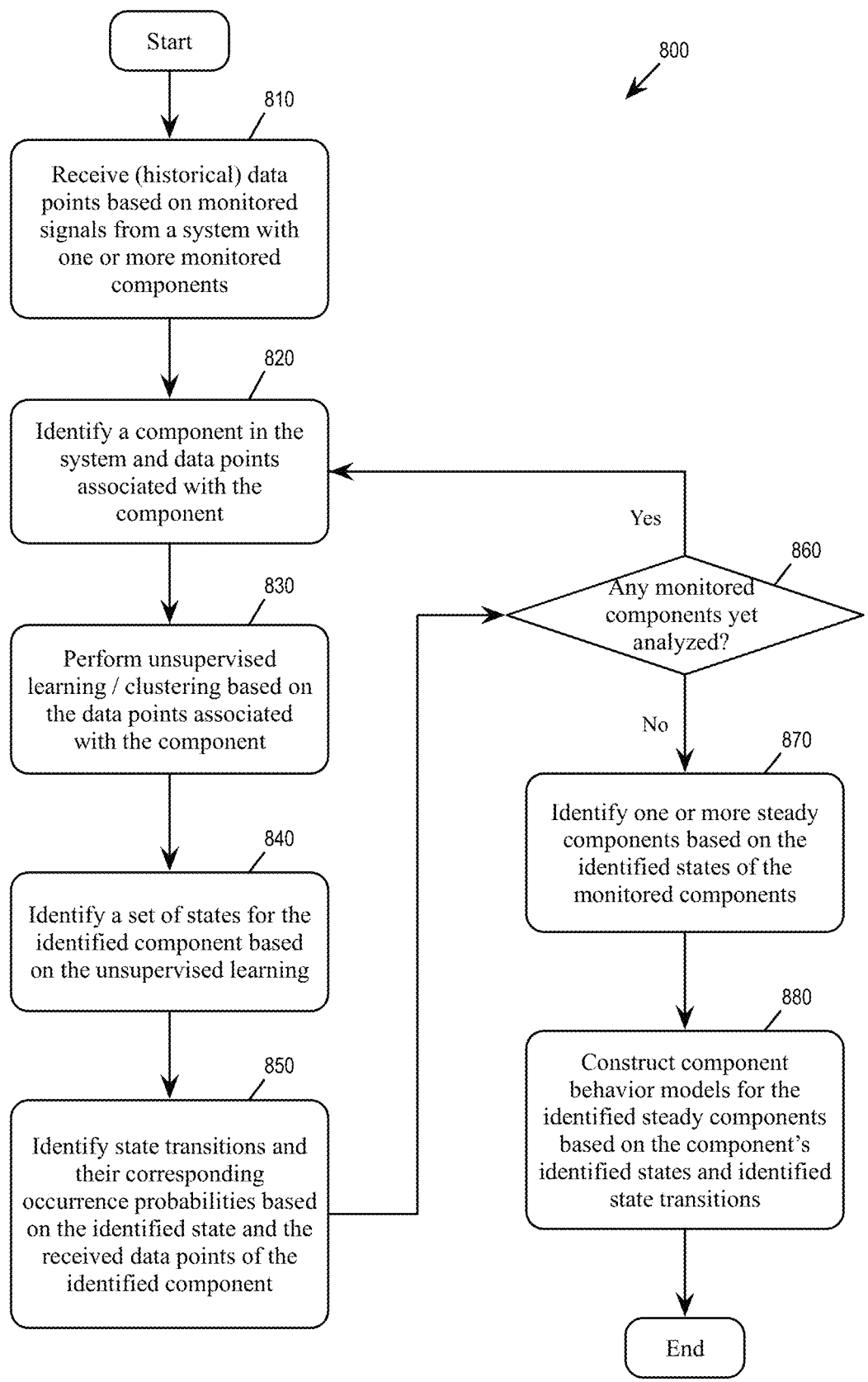
FIG. 8 conceptually illustrates a process for learning the expected behaviors of a system and constructing a set of component behavior models, consistent with an exemplary embodiment.

FIG. 8 conceptually illustrates a process 800 for learning the expected behaviors of a system and constructing a set of component behavior models, consistent with an exemplary embodiment. The process receives monitored signals from the system, identifies states and state transitions for components in the system based on the received monitored signals, and determine which components are steady components. In some embodiments, one or more processing units (e.g., processor) of the behavior-learning computing device 101 perform the process 800 by executing instructions stored in a computer readable medium.

The process 800 starts when the behavior-learning computing device 101 receives (at 810) data points based on monitored signals from a system with one or more monitored components. In some embodiments, the behavior-learning computing device 101 receives the monitored signals from the system and samples the received signals periodically into data samples. The data samples are then mapped into multi-dimensional data points. The monitored signals can be data collected in the past when the system is assumed to be without anomalous behaviors.

The behavior-learning computing device 101 identifies (at 820) a component in the system as well as data points associated with the component. The identification of a component in a monitored system is described above by reference to FIG. 1.

The behavior-learning computing device 101 then performs (at 830) unsupervised learning or clustering (e.g., by using DBSCAN) based on the data points associated with the component. Based on the result of the clustering, the behavior-learning computing device 101 identifies (at 840) a set of states for the identified component. The identification of states based on clustering is described by reference to FIG. 2 and FIG. 3 above.

The behavior-learning computing device 101 also identifies (at 850) state transitions and their corresponding probabilities based on the identified states and the received data points of the identified component. The identification of state transitions is described by reference to FIG. 4 above.

Next, the behavior-learning computing device 101 determines (at 860) whether there are more monitored components in the system whose data points have not been analyzed into states and state transitions. If there is at least one more component yet to be analyzed, the process 800 returns to 820. If all components have been analyzed for states and state transitions, the process proceeds to 870.

At 870, the behavior-learning computing device 101 identifies one or more steady components for whom the behavior-learning computing device cannot not find any new states or state transitions beyond a threshold timing window. The identification of steady components is described by reference to FIG. 5 above.

The process then constructs component behavior models for the identified steady components based on the components' identified states and state transitions. The component behavior model is stored or provided to the anomaly-detecting computing device 102 to detect system anomalies based on subsequent or real-time data. The process 800 then ends.

Figure 9:
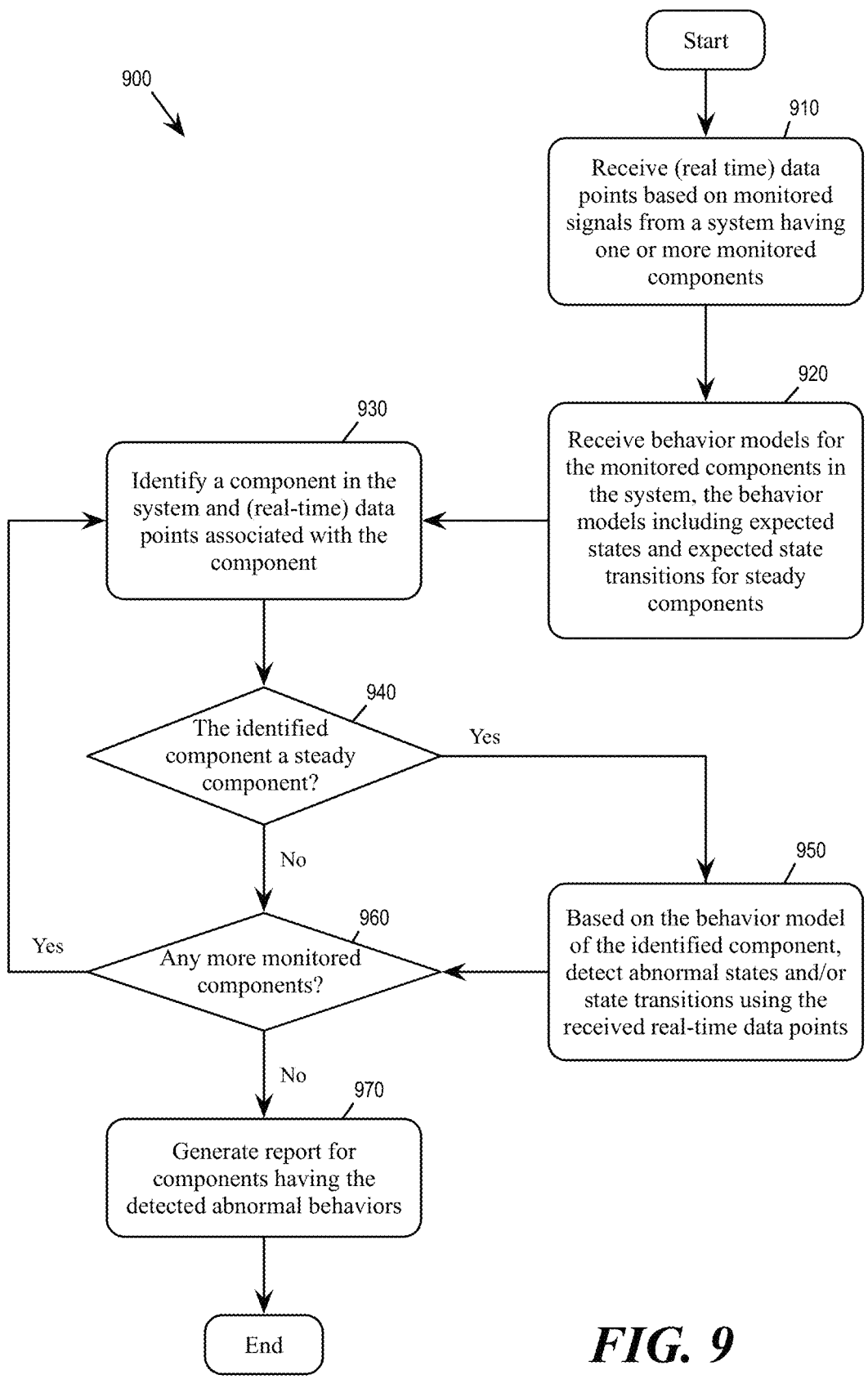
FIG. 9 conceptually illustrates a process for detecting system anomalies based on component behavior models that are learned from the system, consistent with an exemplary embodiment.

FIG. 9 conceptually illustrates a process 900 for detecting system anomaly based on component behavior models that are learned from the system, consistent with an exemplary embodiment. The process compares the data points captured from the monitored signals of the system in real-time against expected states and state transitions of steady components. In some embodiments, one or more processing units (e.g., processor) of the anomaly-detecting computing device 102 perform the process 900 by executing instructions stored in a computer readable medium.

The process 900 starts when the anomaly-detecting computing device 102 receives data points based on monitored signals of a system that has one or more monitored components. In some embodiments, the behavior-learning computing device 101 receives the monitored signals from the system and samples the received signals periodically into data samples. The data samples are then mapped into multi-dimensional data points. These data can be considered real-time data of the system, and the monitored signals/data points are used to identify and detect real time anomalous behaviors in the system.

The anomaly-detecting computing device 102 receives (at 920) the behavior models for the monitored components in the system. The behavior models include expected state and state transitions for components that are identified as being steady components.

The anomaly-detecting computing device 102 identifies (at 930) a component in the system as well as the data points associated with the identified component. The anomaly-detecting computing device 102 determines (at 940) whether the identified component is a steady component. Such indication may be embedded in the received behavior models of the system. The behavior models may also include data only for components identified as steady components. If the identified component is a steady component, the process proceeds to 950. Otherwise, the process proceeds to 960.

At 950, the anomaly-detecting computing device 102 detects anomalous states and/or state transitions based on comparison between the received real-time data points and the received behavior model for the identified steady component, specifically for either having data points that are fall outside of expected states or for having state transitions that occur at frequencies (or probabilities) different from expected probabilities. The detection of anomalous states and/or state transitions is described by reference to FIG. 6 above.

The anomaly-detecting computing device 102 then determines (at 960) whether there are any more monitored components in the system yet to be examined for anomalous behavior. If so, the process returns to 930. If all monitored components have been examined (e.g., compared with the behavior models or identified as not being a steady component), the process proceeds to 970.

At 970, the anomaly-detecting computing device 102 generates a report 700 for components that exhibit abnormal behaviors. FIG. 7 above illustrates an example report of a misbehaving component. The process 900 then ends.

Example Electronic System

The present application may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIGS. 8 and 9) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
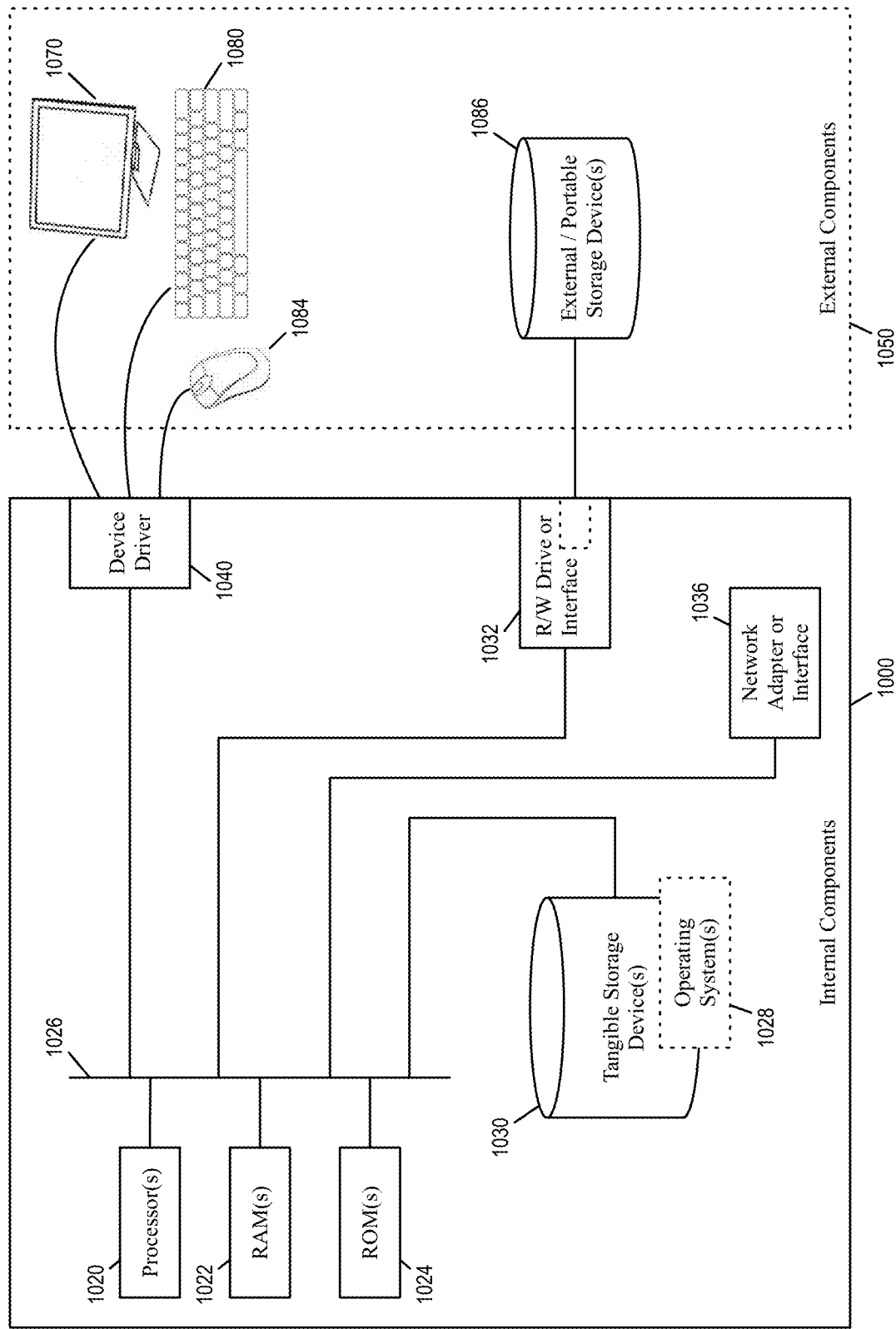
FIG. 10 shows a block diagram of the components of a data processing system in accordance with an illustrative embodiment of the present disclosure.

FIG. 10 shows a block diagram of the components of data processing systems 1000 and 1050 that may be used to implement a system for clustering templates and/or a system for identifying targets in a test bench based on clustered templates (e.g., the behavior-learning computing device 101 and/or the anomaly-detecting device 102) in accordance with an illustrative embodiment of the present disclosure. It should be appreciated that FIG. 10 provides only an illustration of one implementation and does not imply any limitations with regard to the environments in which different embodiments may be implemented. Many modifications to the depicted environments may be made based on design and implementation requirements.

Data processing systems 1000 and 1050 are representative of any electronic device capable of executing machine-readable program instructions. Data processing systems 1000 and 1050 may be representative of a smart phone, a computer system, PDA, or other electronic devices. Examples of computing systems, environments, and/or configurations that may represented by data processing systems 1000 and 1050 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 1000 and 1050 may include a set of internal components 1000 and a set of external components 1050 illustrated in FIG. 10. The set of internal components 1000 includes one or more processors 1020, one or more computer-readable RAMs 1022 and one or more computer-readable ROMs 1024 on one or more buses 1026, and one or more operating systems 1028 and one or more computer-readable tangible storage devices 1030. The one or more operating systems 1028 and programs such as the programs for executing the processes 300 and 800 are stored on one or more computer-readable tangible storage devices 1030 for execution by one or more processors 1020 via one or more RAMs 1022 (which typically include cache memory). In the embodiment illustrated in FIG. 10, each of the computer-readable tangible storage devices 1030 is a magnetic disk storage device of an internal hard drive. Alternatively, each of the computer-readable tangible storage devices 1030 is a semiconductor storage device such as ROM 1024, EPROM, flash memory or any other computer-readable tangible storage device that can store a computer program and digital information.

The set of internal components 1000 also includes a R/W drive or interface 1032 to read from and write to one or more portable computer-readable tangible storage devices 1086 such as a CD-ROM, DVD, memory stick, magnetic tape, magnetic disk, optical disk or semiconductor storage device. The instructions for executing the processes 800 and 900 can be stored on one or more of the respective portable computer-readable tangible storage devices 1086, read via the respective R/W drive or interface 1032 and loaded into the respective hard drive 1030.

The set of internal components 1000 may also include network adapters (or switch port cards) or interfaces 1036 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 1036. From the network adapters (or switch port adaptors) or interfaces 1036, the instructions and data of the described programs or processes are loaded into the respective hard drive 1030. The network may comprise copper wires, optical fibers, wireless transmission, routers, firewalls, switches, gateway computers and/or edge servers.

The set of external components 1050 can include a computer display monitor 1070, a keyboard 1080, and a computer mouse 1084. The set of external components 1050 can also include touch screens, virtual keyboards, touch pads, pointing devices, and other human interface devices. The set of internal components 1000 also includes device drivers 1040 to interface to computer display monitor 1070, keyboard 1080 and computer mouse 1084. The device drivers 1040, R/W drive or interface 1032 and network adapter or interface 1036 comprise hardware and software (stored in storage device 1030 and/or ROM 1024).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving data points that are based on a set of monitored signals of a large system having hundreds of components that are monitored through the set of monitored signals;
for each monitored component, performing unsupervised machine learning based on the data points to identify a set of states and a set of state transitions among the identified states for the component;
identifying one or more steady components based on the identified states of the monitored components;
detecting anomalies in the system based on real-time data points of the system that deviate from the identified states and state transitions of each steady state component, wherein identifying a steady component comprises determining whether the components exhibit all of its identified states within a threshold timing window.

2. The computer-implemented method of claim 1, wherein:
each data point comprises multiple dimensions, and
different types of data in the monitored signals are mapped to different dimensions of the data points.

3. The computer-implemented method of claim 1, wherein:
the monitored signals are sampled periodically as data samples, and
different components are monitored through different sets of data samples.

4. The computer-implemented method of claim 1, wherein identifying the set of state transitions comprises identifying a probability for each state transition based on a tally of the state transition.

5. The computer-implemented method of claim 1, further comprising generating component behavior models for the identified steady components based on the identified states and state transitions of the identified steady components.

6. A computing device comprising:
a set of processing units;

a storage device storing a set of instructions, wherein an execution of the set of instructions by the set of processing units configures the computing device to perform acts, comprising:

receiving data points that are based on a set of monitored signals of a large system having hundreds of components that are monitored through the set of monitored signals;

receiving component behavior models that identify a set of steady components in the system, expected states, and state transitions of the identified steady components;

for each identified steady component, examining the received data points based on the received component behavior models to detect one or more deviation from the expected states and state transitions; and reporting an anomaly in the system based on the one or more detected deviations, wherein the component behavior models comprise an expected probability for each state transition of each steady component.

7. The computing device of claim 6, wherein:
each data point comprises multiple dimensions, and
different types of data in the monitored signals are mapped to different dimensions of the data points.

8. The computing device of claim 6, wherein:
the monitored signals are sampled periodically as data samples, and
different components are monitored through different sets of data samples.

9. The computing device of claim 6, wherein examining the received data points comprises determining whether the received data points are within a cluster associated with an identified state of a steady component.

10. The computing device of claim 6, wherein examining the received data points comprises:
tallying each state transition; and
comparing the tally with the expected probability of the state transition.

11. A computer program product comprising:
one or more non-transitory computer-readable storage device and program instructions stored on at least one of the one or more non-transitory storage devices, the program instructions executable by a processor, the program instructions comprising sets of instructions for:

receiving historical data points based on a set of monitored signals of a large system having hundreds of components that are monitored through the set of monitored signals;

for each monitored component, performing unsupervised machine learning based on the historical data points to identify expected states and state transitions for the component;

identifying one or more steady components based on the identified states of the monitored components;

receiving real-time data points based on the set of monitored signals of the system;

for each identified steady component, examining the received real-time data points for one or more deviations from the expected state and state transitions of the steady component; and reporting an anomaly in the system based on the detected one or more deviations, wherein the set of instructions for identifying the expected state transitions comprises a set of instructions for identifying a probability for each state transition based on a tally of the state transition.

12. The computer program product of claim 11, wherein:
each data point comprises multiple dimensions, and
different types of data in the monitored signals are mapped to different dimensions of the data points.

13. The computer program product of claim 11, wherein:
the monitored signals are sampled periodically as data samples, and
different components are monitored through different sets of data samples.

14. The computer program product of claim 11, wherein the set of instructions identifying a steady component comprises a set of instructions determining whether the components exhibit all of its identified states within a threshold timing window.

15. The computer program product of claim 11, wherein the program instructions further comprise a set of instructions for constructing component behavior models for the identified steady components based on the identified expected states and state transitions of the identified steady components.

16. The computer program product of claim 11, wherein the set of instructions for examining the real-time data points comprises a set of instructions for determining whether the real-time data points are within a cluster associated with an identified state of a steady component.

17. The computer program product of claim 11, wherein the set of instructions for examining the real-time data points comprises a set of instructions for tallying each state transition and comparing the tally with an expected probability of the state transition.

\* \* \* \* \*